United States Patent [19]

Cox

[11] Patent Number: 5,199,068
[45] Date of Patent: Mar. 30, 1993

[54] COMPUTER-BASED TRAINING SYSTEM WITH STUDENT VERIFICATION

[75] Inventor: Robert R. Cox, Newberg, Oreg.

[73] Assignee: Professional Achievement Systems, Inc., Portland, Oreg.

[21] Appl. No.: 643,912

[22] Filed: Jan. 22, 1991

[51] Int. Cl.$^5$ .................. H04K 1/00; G07D 7/00; G06K 9/00

[52] U.S. Cl. .................. 380/23; 340/825.34; 382/3; 382/13

[58] Field of Search .................. 340/825.34; 382/3, 13; 380/23

[56] References Cited

U.S. PATENT DOCUMENTS

| | | | |
|---|---|---|---|
| 4,701,960 | 10/1987 | Scott | 382/13 |
| 4,752,965 | 6/1988 | Dunkley et al. | 382/13 |
| 4,993,068 | 2/1991 | Piosenka et al. | 380/23 |
| 5,029,219 | 7/1991 | Cox | 382/3 |

Primary Examiner—Stephen C. Buczinski
Attorney, Agent, or Firm—Chernoff, Vilhauer, McClung & Stenzel

[57] ABSTRACT

A signature verification system to accompany a computer-based training system to monitor the identity of the training system user. Using a stylus and digitizing pad as a computer input device, the verification system accepts a user's signature made under supervised conditions, and the computer generates various discriminator data associated with the singature, such as time to write signature, signature density and signature size. The verified, supervised signature and associated discriminator data are stored in encrypted format for security against tampering. During sessions on the training system the user is required to enter a signature at random times. Again, corresponding discriminator data for these session signatures is generated by the computer, and the session signature(s) and associated corresponding discriminator data are also likewise encrypted and stored. At a later time, e.g., after the user has completed the training course, the discriminator data corresponding to the verified signature is compared to the discriminator data corresponding to a session signature, and any anomalous session signatures detected are flagged to alert the training course administration personnel to make visual comparison of the respective signatures.

31 Claims, 5 Drawing Sheets

COMPUTER-BASED TRAINING SYSTEM WITH STUDENT VERIFICATION

FIELD OF THE INVENTION

This invention relates to computer-based training ("CBT") systems. More specifically, this invention relates to a system for verifying the identity of CBT users who perform the training in an unsupervised environment.

BACKGROUND OF THE INVENTION

The use of CBT systems to teach students is well known in the art. Typically, CBT systems use a microcomputer work station such as an IBM PC ® to run programs that provide instruction to, and test and elicit answers from, the students on a selected topic of course material. (As used herein, training sessions include instructional sessions, testing sessions, or both combined.) Advancements in the art of computer-based training include the use of interactive audio-visual systems wherein the course of instruction interfaces audio commands from a tape with on-screen computer-based training to create an integrated training environment.

A key advantage of CBT systems is the ability to provide them in an unsupervised environment which allows students to access the training systems according to their own individual schedules. However, for a training system to be effective, and in some cases to satisfy governmental or other certification requirements, it is necessary to verify that the student receiving credit for the training be the same person who participated in the training session. Because the training is unsupervised it is necessary that there be verifiable means to ensure that the student authorized for the training is the same person who performed the training. Conventional CBT systems do not provide a means of checking the identity of CBT users participating in the training session and therefore create a problem for CBT administration officials who must somehow ensure the integrity of the training.

SUMMARY OF THE INVENTION

The present invention solves the problem of verifying the identity of the training session user by storing the user's verified (or control) signature at the time of course registration and thereafter requesting and storing the user's signature at random intervals during the session (hereinafter "session signature"). In addition to storing the session signatures taken at random times, the computer also stores other parameters pertaining to the signature, referred to herein as "discriminator data," such as the length of time for the user to enter the signature, the number of erasures before successfully making the signature, the signature density, and a number indicating the signature size. The time and date of signature entry is also stored with the session signature. When the student has completed a CBT course or session, his/her responses, along with the requested session signatures and associated discriminator data, are transferred into a central computer and a program is run to detect anomalies in the discriminator data, flag anomalous signatures and present the course administrator with the option of visually comparing the anomalous session signature(s) with the verified signature. Anomalies noted from such comparison of the discriminator data can be outputted as a printed report along with course data such as test results, time spent on coursework and other data that may be relevant to a particular course. The system also provides a method of encrypting all data so as to prevent tampering by CBT users.

Accordingly, it is a primary objective of the present invention to provide a computer-based training system that verifies the identity of the user at random intervals during the training session.

It is also an object of the present invention to provide a method of registering and storing handwritten signatures of users of computer-based training systems and comparing discriminator data corresponding to those signatures with discriminator data corresponding to the verified signature of the respective individuals authorized to take a particular training course.

It is another object of the present invention to provide, in a CBT application environment, a computerized method for verifying the identity of the CBT user by detecting anomalies in a handwritten signature entered by the user during a training session and generating a report of the results, either alone or with other data, such as test results from the training session.

It is a further object to provide a CBT system that uses as a primary input device a solitary device that is capable of registering handwritten signatures, computer commands, and responses to queries posed by the training program.

The foregoing and other objectives, features and advantages of the present invention will be more readily understood upon consideration of the following detailed description of the invention taken in conjunction with the accompanying drawings.

BRIEF DESCRIPTION OF THE DRAWINGS AND APPENDIX

Appendix A is a source code listing of an exemplary computer program written in the "C" programming language for registering the user's handwritten signature and detecting anomalies in a session signature as compared to the user's verified signature.

DETAILED DESCRIPTION OF THE INVENTION

The signature verification system of the present invention is used in conjunction with a computer-based training ("CBT") system to verify the identity of the person who participates in a training session. The necessary components of the verification system include the hardware to register the user's signature and the associated software to read the signature, make certain discrimination measurements, store a representation of the signature and associated discriminator data and detect anomalies in the discriminator data.

A brief understanding of a CBT system is necessary to the full description of the present invention. CBT systems rely on a computer to present information to a student and to accept responses from the student relating to questions posed by the training session. An elementary CBT system would have a single computer, a keyboard to input data, a monitor to display information, and a program to run the training session. More sophisticated CBT systems interact with laser disks and/or audio tapes to provide an integrated training environment.

A key advantage of CBT systems is that numerous work stations can be available for use by students, without the need for direct supervision by trained personnel, so that students can access and use the CBT system at times convenient to their own personal schedule.

Figure 1:
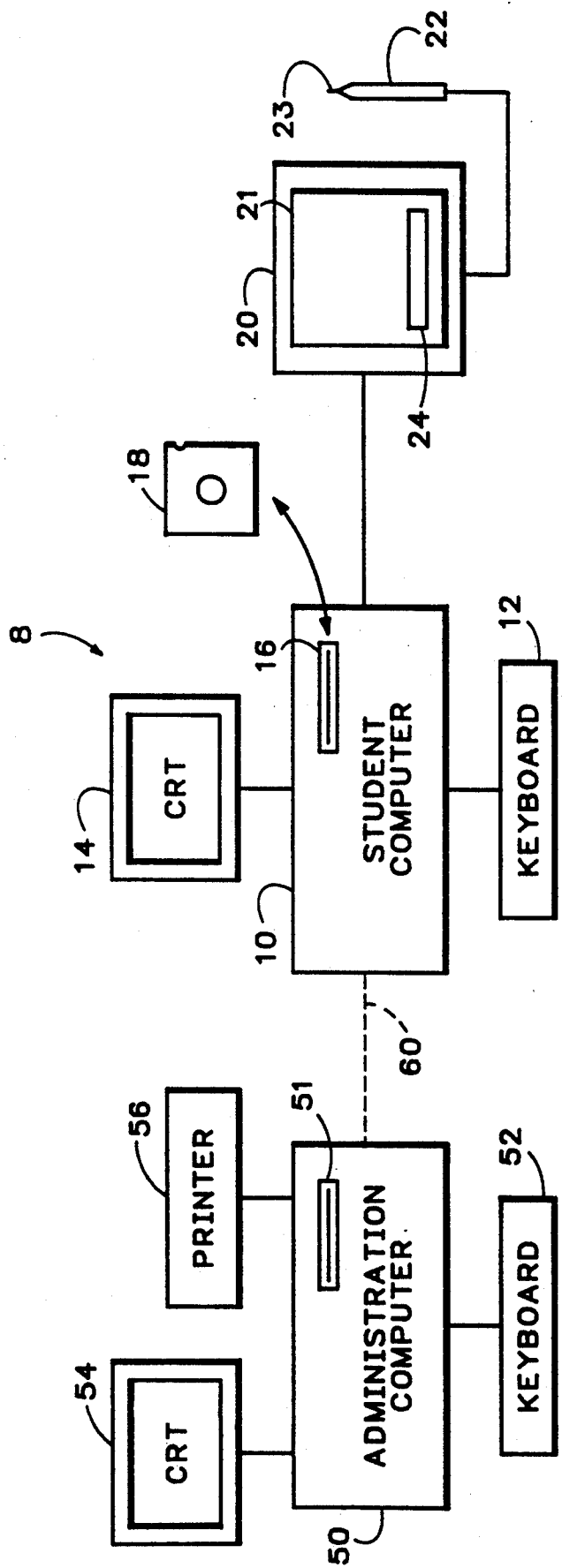
FIG. 1 is a block diagram representing the hardware components of the computer-based training system and signature verification system of the present invention.

FIG. 1 shows a block diagram representation of the hardware components of a system embodying the features of the present invention incorporated into a CBT system. The CBT system 8 includes a student computer 10 which has a keyboard 12, a monitor 14, a stylus 22, and data entry pad 20. Typically, the student computer 10 has a disk drive 16 for reading from and writing to a magnetic disk storage unit 18. The data entry pad 20 is preferably a digitizing tablet.

Figure 3:
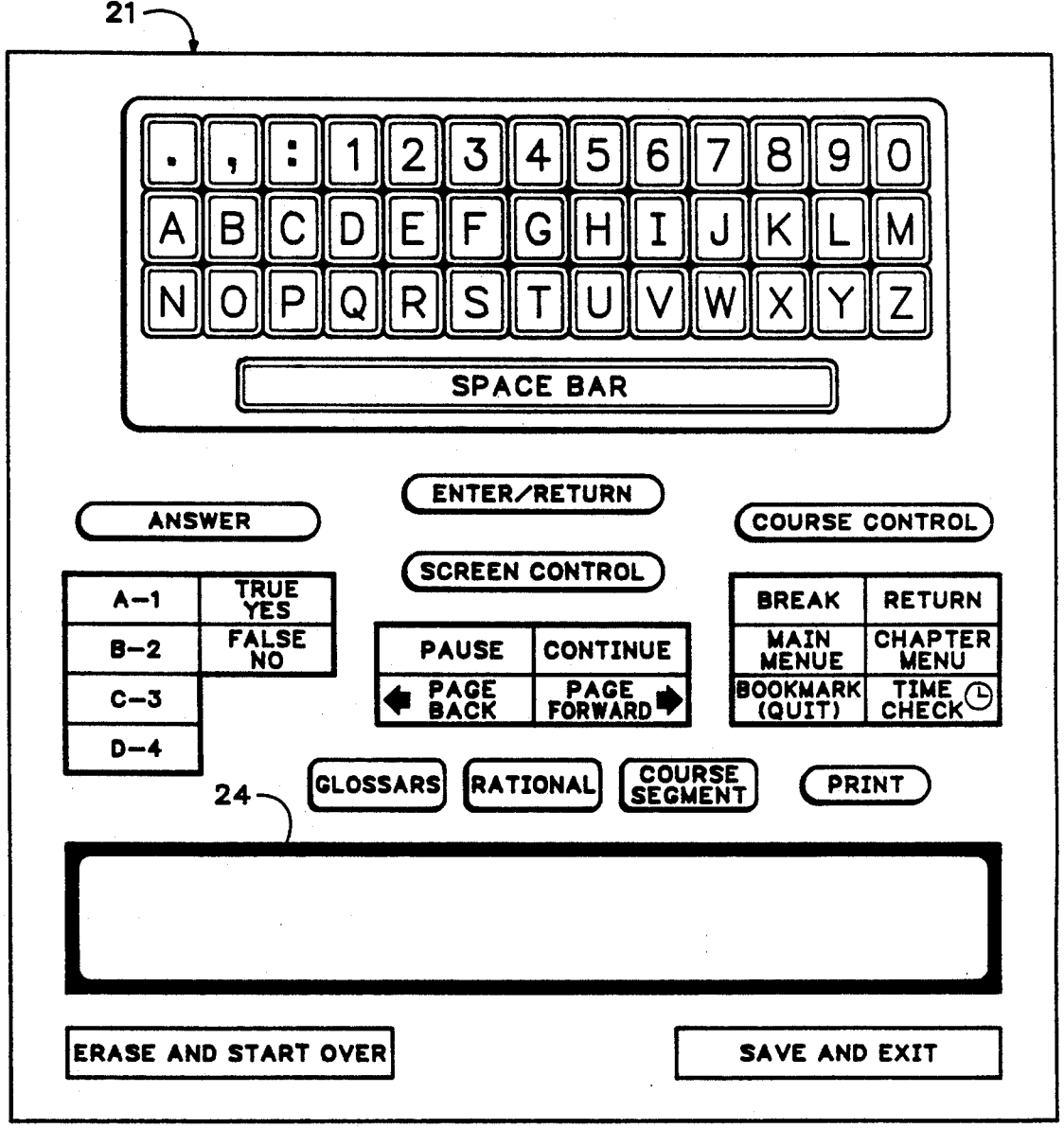
FIG. 3 is a representation of a template that is mounted onto a digitizing pad that is associated with the stylus.

The data entry pad 20 and stylus 22, which may be of conventional design, serve as the primary input device for the student's use in communicating with the computer. The top of the pad is covered with a custom-designed template 21. As shown in FIG. 3, the template has a signature input area 24; the remaining portion of the template is segregated into portions corresponding to characters, symbols and text and is used as a data entry area. The student uses the pad and stylus to input commands to the computer, to respond to test queries from the CBT program and to sign his/her signature. To use the pad and stylus, the student positions the tip of the stylus over an area on the template that corresponds with the desired input and presses down on the stylus to depress the tip 23. The computer will detect the position of stylus when the tip is depressed and generate the appropriate corresponding command or letter.

The student would perform a signature by pressing the stylus against the pad in the signature area 24 with sufficient force to depress the tip 23 of the stylus. The student then uses the stylus as he would a pen to handwrite a signature. When the computer detects the stylus in the signature area the computer will represent the student's signature on the monitor 14. When the stylus is in the signature area and the tip is depressed and the stylus is moving, the computer will draw a line on the monitor corresponding with the line motion made by the student. When the stylus is moved without having its tip depressed the computer will not make a line on the monitor. Thus, when the student lifts the stylus to start a new word the monitor will show the movement as a space and the words will be properly spaced apart.

In addition to the student computer there is also an administration or central computer 50 with an associated disk drive 51, keyboard 52, monitor 54 and printer 56. Operationally, the administration computer would be in a secured area not accessible to students who participate in CBT sessions. Typically, the two computers would interface by downloading the necessary information from the student computer 10 onto the floppy disk 18 and then manually transporting the disk to the administration computer 50. Alternatively, the administration computer could be connected to the student computer by a hard wire link (dashed line 60) therebetween. A number of such student computers could be networked or linked to a single central administration computer.

Figure 2:
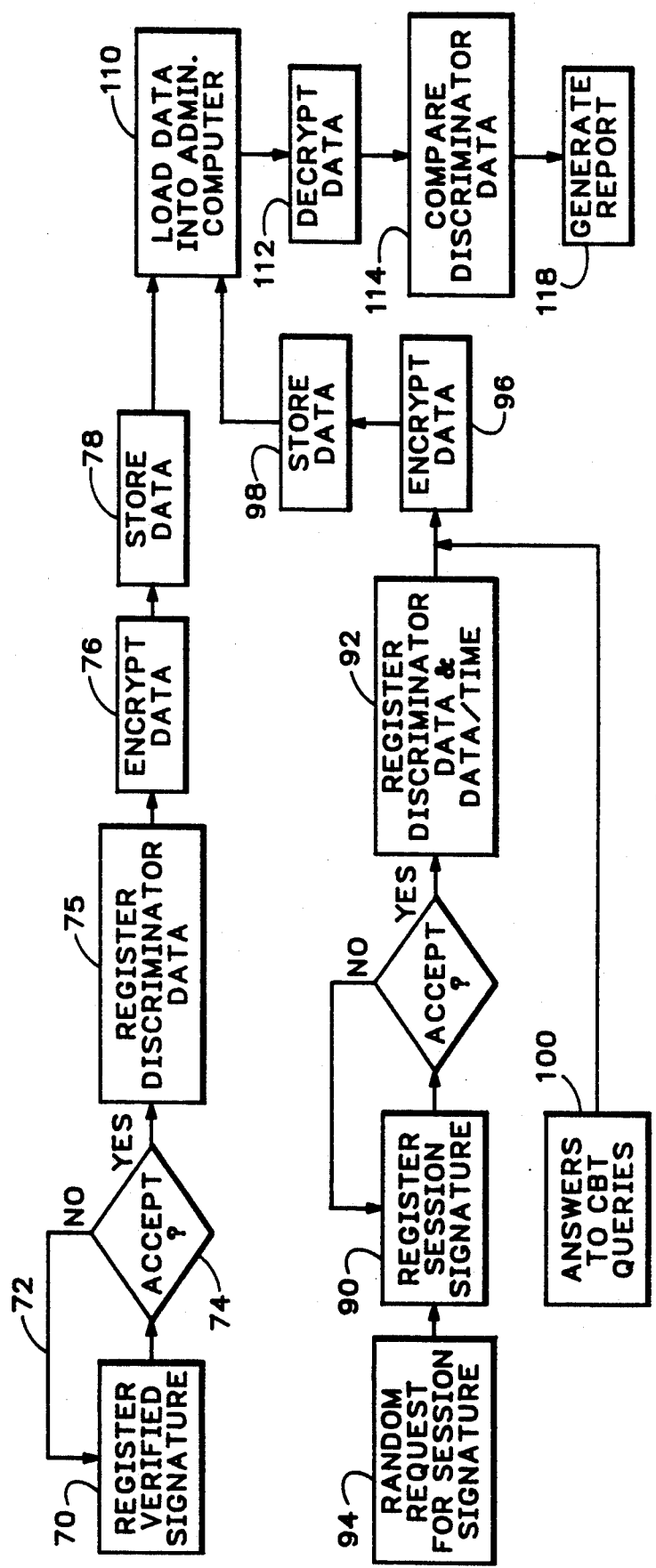
FIG. 2 is a logic block diagram of the signature verification system.

Referring to FIG. 2, the individual steps of the verification system of the present invention will now be explained in detail. A student becomes an authorized user of the CBT system by performing the necessary registration steps with the CBT administration personnel. At the time of authorization the student is required to perform a verified signature. (Alternatively, the verified signature could be collected at the time of the student's first use of the CBT system.) Using the digitizing pad 20 and the stylus 22 (FIG. 1), the student creates a signature in the signature area 24 by using the stylus as a pen and simulating "writing" in the signature area. The pad and stylus create a machine-readable code that represents the student's signature, which code is "registered" by the computer. (Alternative means for registering the signature, other than by stylus and digitizing tablet, are available. For example, the signature could be written by the student using a standard "mouse" on any flat surface or by using a light pen and writing directly onto the screen of the monitor 14.) The student's signature is thereby registered as a verified (or control) signature, loaded into the computer's RAM and displayed on the monitor 14 for the student to view. This action is represented by block 70. After completing the signature the student has the option to accept the signature or erase it and start over. (This is provided for convenience so someone not familiar with the use of the stylus has a chance to write a more representative signature.) This looping process 72 (writing signature, accepting or erasing) is repeated until the student accepts the signature. When the student indicates satisfaction with the signature, discriminator data (described below) is registered at 75 and the signature data and discriminator data are then encrypted by means 76 and stored onto a data storage medium 78 which is typically the magnetic disk 18 (FIG. 1). The discriminator data corresponding to the verified signature comprises the signature size, signature density ratio and time to create the signature by the user. The number of erasures may also be recorded. The encrypted, stored verified signature and discriminator data are then, at some later date, transported to, and loaded into, the administration computer 110.

A student will begin a training session by logging onto the computer 10 or loading a disk 18 onto the disk drive 16 of the student computer 10 and executing a program for conducting a training session. Training sessions that are part of a series of sessions will typically read information from the student's personal disk 18 to determine the stage of computer training that should be next executed. The training session then begins and the student follows instructions as presented by the CBT program on the monitor 14. The verification system may, if desired, be programmed to request a session signature from the student at the beginning of each training session.

During the training session, the verification system will randomly generate requests 94 for session signatures form the student at a rate selected by administration personnel. For example, the administration personnel may select a sample rate of 60 minutes in which case the CBT system will query the CBT user for a session signature randomly once each 60-minute interval. The student must then write his/her name in the signature area 24 of the digitizing pad 20 in order to continue the training session. The signature is displayed graphically on the monitor 14. After writing the signature the student has the option of accepting the signature or erasing it and writing a new one. When the signature is finally deemed acceptable by the student it is registered and stored in the computer. The system also records the date and time of signature registration and measures and records various discriminator data associated with the signature for use in signature analysis. The discriminator data includes the elapsed time for a student to write a signature, the number of erasures before the student indicates satisfaction with the signature representation, a signature density ratio, and a numerical size indication of the signature. The elapsed time and number of erasures are self-explanatory.

The size of the signature is determined by the smallest rectangle that can enclose the signature. Apologizing the signature display to the first quadrant of a Cartesian coordinate plane—the computer calculates the maximum x and y and the minimum x and y of bits set (or pixels on the monitor 14) by the signature representation. The maximum x and y and minimum x and y define the four sides of a rectangle that is directly proportional to the numerical size discriminator datum.

The density ratio is calculated by dividing the number of bits set by the signature representation into the number of bits within the smallest enclosing rectangle as calculated in the size determination portion of the program described above. The number of bits set reflects the curvilinear length of the signature lines.

Figure 4A:
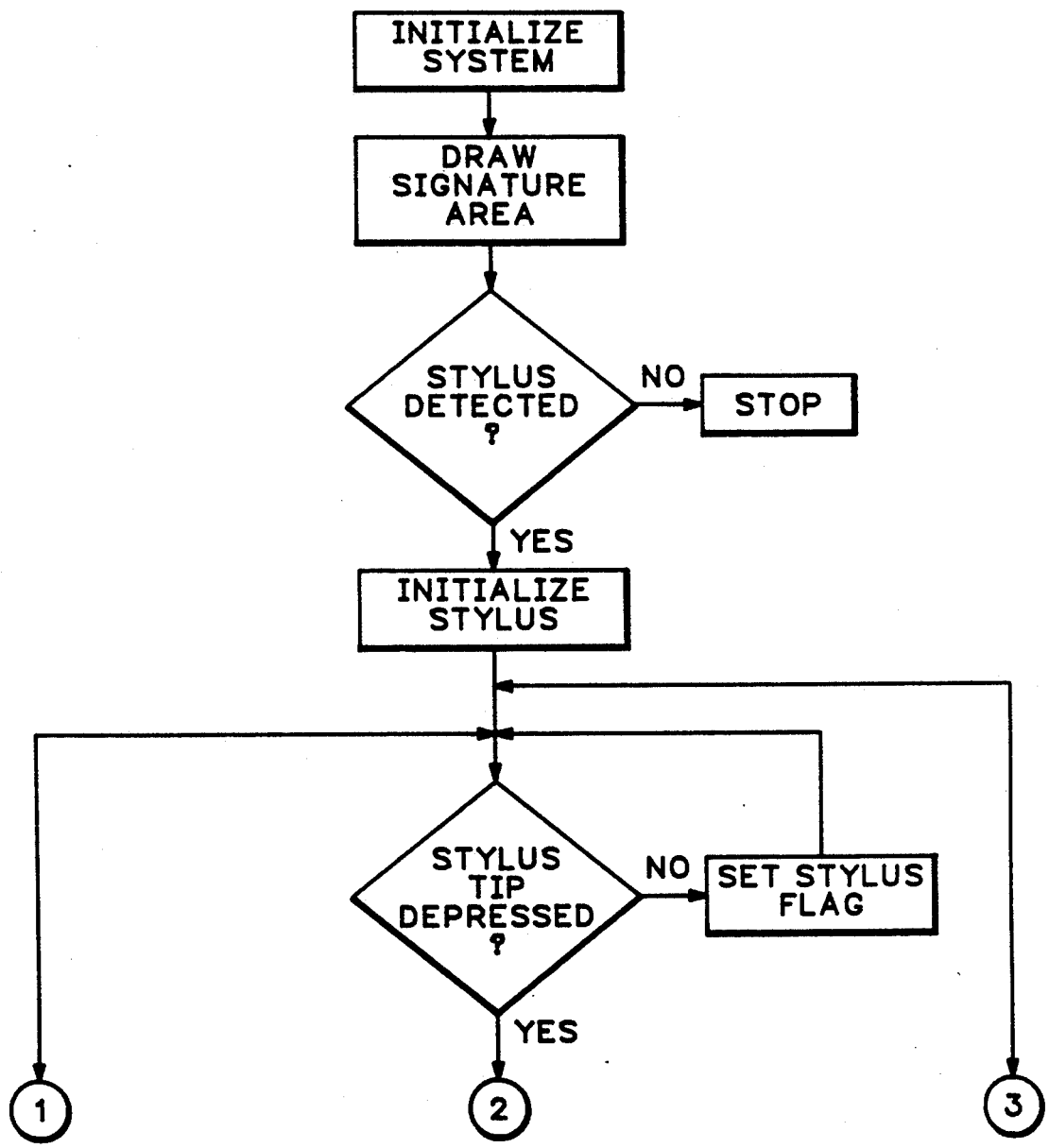
FIGS. 4A and 4B show an exemplary logic flow diagram illustrating the operation of a computer software program that registers the handwritten signature data.
Figure 4B:
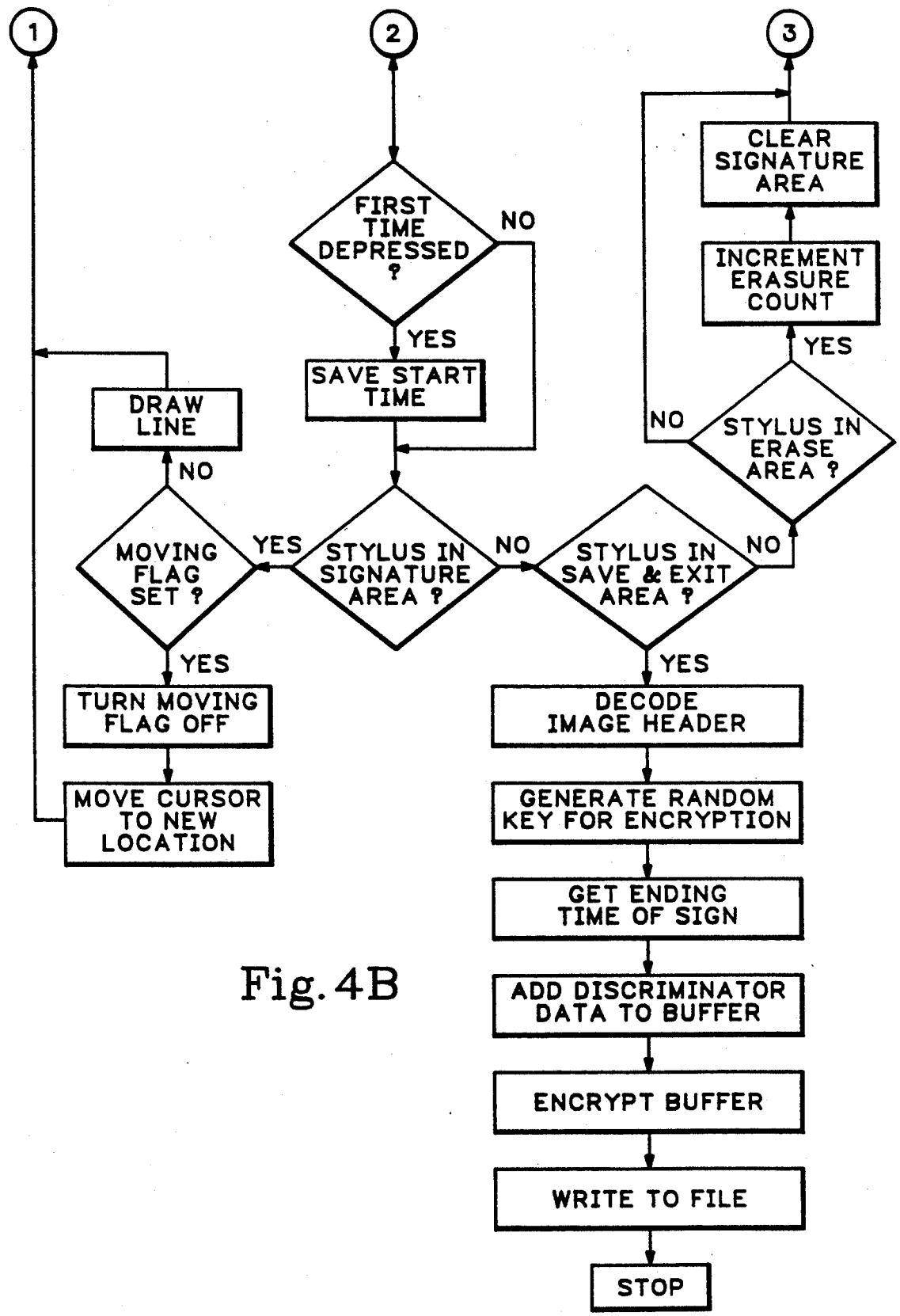

The signature registration routine is diagrammatically represented by the logic flow diagram shown in FIG. 4 which illustrates the logic flow for the source code reprinted in Appendix A. The logic flow diagram is self explanatory and can be understood by those familiar with the art.

After the signature is registered, the time, date, and discriminator data along with the signature representation data are then encrypted at 96 for security purposes, so as to prevent tampering, for example, and the encrypted data stored at 98 on a magnetic storage media such as disk 18. The student's answers in response to queries by the CBT program at 100 are also encrypted and stored along with the session signature(s), time, date and discriminator data. Thus, at the end of a training session the student's disk will contain the results of the CBT training session, including the student's answers to CBT test queries, and his/her signature representations with time, date and discriminator data. All data is stored in encrypted format. This disk could then be manually transported to the administration computer 110, or alternatively the information could be sent by a hard-wire network link.

After the verified signature, the requested session signatures, the discriminator data, and responses to the CBT queries are loaded into the administration computer it is possible to analyze the data and generate a report for administration personnel. To do so, the data is read into a report program, decrypted by means 112 and a program 114 detects anomalies in the discrimination data. An anomaly is detected when a discriminator datum falls outside a predetermined range of acceptable deviation as compared to the corresponding discriminator datum of the verified signature. The range of acceptable deviation is determined by statistical methods based upon empirical data and is subject to improvement as the data base grows. A source code listing of an exemplary program for comparing and detecting signature anomalies is included in Appendix A. This information is then organized into a useful form and a report 118 is generated which can be listed on the printer 56 or monitor 54. The CBT administrator has the option of viewing signature(s) corresponding to anomalous discriminator data on the monitor 54 of the central computer or the printer 56, and thereby visually comparing, side-by-side, the verified and session signatures.

It will be recognized that, instead of storing the encrypted signature information on a disk medium 18, it would also be feasible to hardwire the student computer 10 to the administration computer 110. This would eliminate the need to manually transport the disk between the student computer and the administration computer.

In addition to the signature discriminator data mentioned above, it is possible to measure and register additional discriminator data depending upon the degree of security required for the CBT system. For example, there are known signature recognition systems that measure other characteristics of a signature such as handwriting speed. One such system is shown in Engelbrecht, U.S. Pat. No. 3,962,679. It will be apparent that such systems could readily be integrated into the present invention to provide different or additional discriminator data to be stored along with the representations of the signatures for use in later comparison.

It is also feasible for the operations of the student computer 10 and the administration computer 110 to be performed on the same computer. The present invention separates the system between two computers for security and logistics reasons. However, the steps shown in FIG. 2 and the hardware components of FIG. 1 could easily be accomplished within a single computer system in which security would be maintained by providing limited access to data. Data access could be limited by providing security codes that are known only by authorized administration personnel which codes would be required by the computer before permitting access to sensitive data.

The source code for the signature registration program is reprinted in Appendix A. The majority of the program is coded in the programming language known as "C." Two pages at the end of the listing, written in a data manipulative language known as CLIPPER ®, show the functions comparing the discriminator data of the verified signature with that of the session signature to detect anomalies in the latter.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

APPENDIX A

SIGN.C

Microsoft QuickC 2.0 Compiler (qcl /c /AS sign.c)
Microsoft QuickC Linker 4.06 (link sign,,,pcx_cl slibce)
PCX Programmer's Toolkit 3.5 - Genus Microprogramming Note : All function calls beginning with 'pcx' are from the
   PCX toolkit, all other are local or from the standard
   libraries

/**************************************************/

/*----------------------------------------
   compiler directives
   --------------------------------------*/

```
#define MOUSE    0x33
#define FAIL     0
#define TRUE     1
#define BLACK    0
#define WHITE    15
define BUFMAX   2000 include <stdio.h>
include <stdlib.h>
#include <conio.h>
#include <math.h>
#include <time.h>
#include <graph.h>
#include <dos.h>
#include "pcxlib.h"
```

/*----------------------------------------
   function prototypes
   --------------------------------------*/

```
void Quit_Pgm(void);
void Graphics_Setup(int *x_res, int *y_res, int *trow, int *pcxtype);
void Mouse_Initialize(int *mouse_flag ) ;
void Mouse_Show(void) ;
void Mouse_Hide(void) ;
void Mouse_SetPos(int *mouse_x, int *mouse_y, int *mouse_button);
void Mouse_Status(int *mouse_x, int *mouse_y, int *mouse_button);
void Mouse_Setrangeh(int, int);
void Mouse_Setrangev(int, int);
void Delayed(void);
void Erase_Pad(int, int, int, int);
int  Bit_cnt(unsigned short);
```

/*----------------------------------------
   global variables
   --------------------------------------*/

```
union REGS inregs, outregs;

unsigned char buffer[BUFMAX];
```

/*----------------------------------------*/
main( )
/*----------------------------------------*/

```
/*----------------------------------------
  local variables
------------------------------------------*/

PCXHEADER header;
unsigned short byte_val,data;
int new_loc;
int x1,y1,x2,y2,cnt;
int mouse_maxx=0,mouse_maxy=0;
int mouse_minx=0,mouse_miny=0;
int mouse_flag=0;
int mouse_button=0;
int mouse_x=0,mouse_y=0;
int x_res=0,y_res=0;
int trow=0;
int pcxtype;
int set_bits;
int erase_cnt=0;
int top,left,bott,right = 0;
int top_pixel = 1 ;
int timed = 0 ;
int no_bytes, line_cnt,i;
int width,len,near_byte,near_word,xtra_bytes,xtra_bits;
int repeat_cnt;
int ok=0;
float pcxt=0.96;
long bg=3;
int retcode;
int bufsize;
int key;
unsigned pos_cnt = 0;
time_t *start, *finish;
struct dostime_t rtime,dtime;
int disc[12];

/*----------------------------------------
  set up graphics enviroment, if mode cannot be set, exit
------------------------------------------*/

Graphics_Setup(&x_res,&y_res,&trow,&pcxtype);
if (pcxSetDisplay(pcxtype) == pcxSUCCESS)
   if (pcxSetMode(pcxgRAPHICS) !=pcxSUCCESS)
      Quit_Pgm() ;

/*----------------------------------------
  draw signature entry area
------------------------------------------*/ mouse_maxx = x_res-5;
mouse_maxy = y_res-5;

mouse_minx = 3;
mouse_miny = 3*y_res/4;

_settextcolor(WHITE);
_settextposition(trow,10);
_outtext("Erase and Start Over");
_settextposition(trow,54);
```

```
_outtext("Save and Exit");
_setcolor(WHITE);
_rectangle(_GBORDER,0,3*(y_res-1)/4,x_res-1,y_res-1);
_rectangle(_GBORDER,0,mouse_maxy*pct,x_res-1,mouse_maxy);
_rectangle(_GBORDER,x_res/2,mouse_maxy*pct,x_res/2,y_res-1);

/*----------------------------------------------
check for mouse, if present set up, else exit program
----------------------------------------------*/

Mouse_Initialize(&mouse_flag);
if (mouse_flag==0)
{
    _settextposition(10,15);
    _outtext("Error - No mouse found");
    Quit_Pgm();
}

Mouse_Setrangeh(mouse_minx,mouse_maxx);
Mouse_Setrangev(mouse_miny,mouse_maxy);
Mouse_SetPos(&mouse_x,&mouse_y,&mouse_button);
_moveto(mouse_x,mouse_y);
Mouse_Show();

/*----------------------------------------------
main signature capture loop
----------------------------------------------*/ while (TRUE)
{
    /*----------------------------------------------
    get mouse status, if pen tip depressed check position and
    process depending upon area of tablet clicked on
    ----------------------------------------------*/

Mouse_Status(&mouse_x,&mouse_y,&mouse_button);
    if (mouse_button==1)
    {
        /*----------------------------------------------
        if this is the first time pen tip has been depressed,
        mark starting time, will be used to calculate total
        elapsed time to complete and save signature
        ----------------------------------------------*/ if (!timed)
        {
            timed = 1;
            time(start);
        }
        /*----------------------------------------------
        If pen is depressed in signature area check to see if
        pen has been continually depressed or lifted up and
        moved to a new location, if depressed, draw line, else
        move pen cursor to new location on screen without
        drawing a line
        ----------------------------------------------*/ if (mouse_y < mouse_maxy * (pct - 0.01))
            if (new_loc==1)
            {
```

```
    _moveto(mouse_x,mouse_y);
    new_loc=0;
  }
  else
  {
    Mouse_Hide();
    _setcolor(WHITE);
    _lineto(mouse_x,mouse_y);
    Mouse_Show();
  }
}
else
{
  /*----------------------------------
  If pen is depressed in 'save and exit' area save
  signature image to a buffer in PCX format and
  extract 'discrimination data' from the buffer
  ----------------------------------*/ if ( mouse_y > mouse_maxy * (pct - 0.01) && mouse_x > x_res/2 &&
       new_loc == 1)
  {
    x1     = mouse_minx + 7;
    y1     = mouse_miny;
    x2     = mouse_maxx;
    y2     = mouse_maxy*(pct - 0.01);
    bufsize = pcxDisplayBUffer(buffer,BUFMAX,x1,y1,x2,y2,0);

/*----------------------------------
    get file header from buffer to determine size
    of image and extract scanline length, because of
    the storage format it isnecessary to determine
    any extrabits and bytes that do not actual
    store image pixel information but are used to
    align scanlines on byte and word boundaries
    ----------------------------------*/ pcxGetBufferHeader(buffer,&header);

width    = header.x2 - header.x1 + 1;
    len      = header.y2 - header.y1 + 1;
    near_byte = ceil(width / 8 + .49);
    near_word = ceil(width / 16 + .49(;
    xtra_bytes = ceil((near_word * 16 - width) / 8 + .49);
    xtra_bits  = width % 8;
left   = near_byte;

/*----------------------------------
decode image buffer and count number of set bits
(pixels) disregard bytes not actually storing
image information (end of scanlines and file)
----------------------------------*/ if (bufsize > 0)
{
  set_bits = 0;
  no_bytes = 1;
  line_cnt = 1;
```

```
for (i = 128; i <= bufsize; i += 1 )
{
   if (line_cnt >= len)
      break;
   if (no_bytes % near_bytes == 0)
   {
      i += (xtra_bytes - 1);
      no_bytes = 1;
      line_cnt += 1;
   }
   else
   {
      byte_val = buffer[i] ;
      if (byte_val >= 192)
      {
         repeat_cnt = byte_val - 192;
         i += 1;
      }
      else
         repeat_cnt = 1;

no_bytes += repeat_cnt;
      data = buffer[i];
      if (data > 0)
      {
         /*---------------------
           record top, bitt, leftmost, and
           rightmost pixel locations used to
           determine bounding dimensions of
           signature
         ---------------------*/ if (top_pixel)
         {
            top_pixel = 0;
            top = line_cnt;
         }
         if (no_bytes < left)
            left = no_bytes;
         if (no_bytes > right)
            right = no_bytes;
            bott = line_cnt;
            set_bits += (repeat_cnt * Bit_Cnt(data));
      }
   }
}

/*---------------------
  save buffered image to a disk file and exit
  program
---------------------*/

_dos_gettime(&rtime);
srand(rtime.hsecond);
key = rand();

for (i = 0; i <= bufsize; i++)
   buffer[i] ^= key;
```

```
/*----------------------------------
  output discrimination data
----------------------------------*/

_dos_gettime(&dtime);
_dos_getdate(&ddate);
time(finish);

disc[0]  = set_bits;
disc[1]  = erase_cnt;
disc[2]  = difftime(*finish,*start);
disc[3]  = bott - top + 1;
disc[4]  = (right - left+ 1) * 8;
disc[5]  = dtime.hour;
disc[6]  = dtime.minute;
disc[7]  = dtime.second;
disc[8]  = dtime.year;
disc[9]  = dtime.month;
disc[10] = ddate.day;
disc[11] = key;

for (i = 0; i <= 10; i++)
{
   disc[i] ^= key;
   buffer += disc[i] ;
} pcxBufferFile(buffer,bufsize+24,"sign.tmp");
Quit_Pgm();
}

/*----------------------------------
if pen is depressed in 'erase and start over' area
of tablet, erase signature area, increment erasure
count and continue capturing signature
----------------------------------*/
         if (mouse_y > mouse_maxy *(pct - 0.01) && mouse_x < x_res / 2 &&
            new_loc == 1)
         {
            x1 = 1;
            y1 = 3*(y_res-1)/4+1;
            x2 = x_res-2;
            y2 = mouse_maxy*pct-1;

Erase_Pad(x1,y1,x2,y2);
            erase_cnt += 1;
         }
      }
   }

/*----------------------------------
      if pen was not depressed flag it so that the routine will
      move the pen cursor without drawing a line
      ----------------------------------*/ if (mouse_button != 1)
         new_loc = 1;
   }
}
```

```c
/****************************************************/
 end of main function, local function definitions follow
/****************************************************/

/****************************************************/
void Quit_Pgm(void)
/****************************************************/
{
/* _setvideomode(_DEFAULTMODE);*/
   exit(1);
}

/****************************************************/
int Bit_Cnt(unsigned short val)
/****************************************************/
{
    /*----------------------------------------
    count number of set bits in data byte and return count
    (data is actually stored in a two byte interger but the
    second byte is ignored)
    ----------------------------------------*/ int cnt = 0;

for(;val != 0; val >>= 1)
        if (1 & val)
            cnt += 1;

return (cnt);
}

/****************************************************/
void Graphics_Setup(int *x_res, int *y_res, int *trow,
                    int *pcxtype)
/****************************************************/
{
    /*----------------------------------------
    set the vidoe mode to the highest mode the hardware will
    support, 2 color VGA, EGA and CGA is supported, 2 color is
    used to reduce the complexity of the stored signature image
    ----------------------------------------*/ if (_setvideomoderows(_VRES2COLOR,43)!=FAIL)
    {
       *x_res = 640;
       *y_res = 480;
       *trow  = 43;
       *pcxtype = pcxVGA_11;
       return;
    }
    if (_setvideomoderows(_ERESNOCOLOR,43)!=FAIL)
    {
       *x_res = 640;
       *y_res = 350;
       *trow  = 43;
       *pcxtype = pcxEGA_F;
       return;
```

```c
    }
    if (_setvideomoderows(_HRESBW,25)!=FAIL)
    {
       *x_res  = 640;
       *y_res  = 200;
       *trow   = 25;
       *pcxtype = pcxCGA_6;
       return;
    }
    if (*x_res=0)
    {
       exit(0);
    }
    return;
}

/***************************************************/
void Mouse_Initialize(int *mouse_flag)
/***************************************************/
{
   inregs.x.ax = 0;
   int86(MOUSE,&inregs,&outregs);
   *mouse_flag = outregs.x.ax;

return;
}

/***************************************************/
void Mouse_Show (void )
/***************************************************/
{
   inregs.x.ax = 1 ;
   int86 ( MOUSE, &inregs, &outregs ) ;

return;
}

/***************************************************/
void Mouse_Hide (void )
/***************************************************/
{
   inregs.x.ax = 2 ;
   int86 ( MOUSE, &inregs, &outregs ) ;

return;
}

/***************************************************/
void Mouse_Status(int *mouse_x, int *mouse_y, int *mouse_button)
/***************************************************/
{
   inregs.x.ax=3;
   int86(MOUSE,&inregs,&outregs);
   *mouse_button=outregs.x.bx;
   *mouse_x=outregs.x.cx;
   *mouse_y=outregs.x.dx;
   Delayed();

return;
```

```c
/****************************************************/
void Mouse_SetPos(int *mouse_x, int *mouse_y, int *mouse_button)
/****************************************************/
{
    inregs.x.ax=4;
    inregs.x.cx=*mouse_x;
    inregs.x.dx=*mouse_y;
    int86(MOUSE,&inregs,&outregs);

return;
}
/****************************************************/
void Mouse_Setrangeh(int mouse_minx, int mouse_maxx)
/****************************************************/
{
    inregs.x.ax=7;
    inregs.x.cx=mouse_minx;
    inregs.x.dx=mouse_maxx;
    int86(MOUSE,&inregs,&outregs);

return;
}

/****************************************************/
void Mouse_Setrangev(int mouse_miny, int mouse_maxy)
/****************************************************/
{
    inregs.x.ax=8;
    inregs.x.cx=mouse_miny;
    inregs.x.dx=mouse_maxy;
    int86(MOUSE,&inregs,&outregs);

return;
}

/****************************************************/
void Delayed(void)
/****************************************************/
{
    int t1=0;
    do {t1+1;} while (t1<10000);

return;
}

/****************************************************/
void Erase_Pad(int x1, int y1, int x2, int y2)
/****************************************************/
{
    _setcolor(BLACK);
    _rectangle(_GFILLINTERIOR,x1,y1,x2,y2);
    _setcolor(BLACK);

return;
}
```

```
FUNCTION signcomp

PRIVATE ctrl[11],disc[11]
PRIVATE ctrl,dsic_data ctrl = TRUE

*_____
* get control values from file, these will be used to compare
* the newly loaded signatures's discrimination data against the
* control's discrimination data
*_____

SELECT 0
USE sign INDEX s_ctrl

SEEK ctrl
IF !FOUND()
   ?"error - no control signature"
   RETURN VOID
ENDIF disc_data = RIGHT(sign->image,24)
key = BIN2I(SUBS(disc_data,23,2))
j = 1
FOR I =1 to 21 STEP 2
   disc[j] = xor(BIN2I(SUBS(disc_data,i,2)),key)
   j = j+1
NEXT FOR I = 1 TO LEN(ctrl)
   IF disc[I] < ctrl[I]*.9 .OR. disc[I] > ctrl[I]*1.1
      ? "Significant variability in discrimination data"
      ?
      DO CASE
         CASE i = 1
            ? "set_bits  =", disc[i]," control = ",ctrl[i]
         CASE i = 2
            ? "erase_cnt =", disc[i]," control = ",ctrl[i]
         CASE i = 3
            ? "elapsed   =", disc[i]," control = ",ctrl[i]
         CASE i = 4
            ? "height    =", disc[i]," control = ",ctrl[i]
         CASE i = 5
            ? "width     =", disc[i]," control = ",ctrl[i]
      ENDCASE
   ENDIF
NEXT

USE

RETURN VOID
***signchk.prg

PUBLIC TRUE,FALSE,VOID

TRUE = 1
FALSE = 0
VOID = .T.
```

```
signload()
signcomp()

RETURN

*****************************************************
FUNCTION signload
*****************************************************

PRIVATE signfile,file_err,handle,size,buffer,bytes signfile = "SIGN.TMP"
file_err = 0

IF FILE(signfile)
   handle = FOPEN(SIGNFILE)
   size   = FSEEK(handle,0,2)
   FSEEK(handle,0,0)
   buffer = SPACE(size)
   IF handle != -1
      bytes = FREAD(handle,@buffer,size)
      IF bytes = size
         IF IFCLOSE(handle)
            file_err = -3          && error closing file
         ENDIF
      ELSE
         file_err = -2             && error reading file
      ENDIF
   ELSE
      file_err = -1                && error opening file
   ENDIF
ENDIF IF file_err < 0
   ? "Error - " + ALLTRIM(STR(file_err))
   RETURN VOID
ENDIF SELECT 0
USE sign INDEX s_ctrl APPEND BLANK
REPLACE sign->control WITH TRUE
REPLACE sign->image   WITH buffer USE
ERASE signfile

RETURN VOID
```

What is claimed is:

1. A signature verification system for use as part of a computer system to ascertain the identity of a user thereof, said verification system comprising:
   (a) means for registering a machine-readable form a representation of said user's signature;
   (b) means for requesting said user to register said signature at a random time during a session of computer operation;
   (c) means for discerning by computer at least one discriminator datum of said signature;
   (d) means for storing at least two said representations of signatures registered at different times and respectively corresponding discriminator data; and
   (e) means for comparing discriminator data from two different signatures to determine whether the same person caused the respective signatures to be registered.

2. The system of claim 1 wherein the means for registering said signature is a digitizing tablet and stylus.

3. The system of claim 1 wherein said storing means is a computer with data storage means.

4. The system of claim 1, wherein said means for comparing said discriminator data comprises a computer and computer program.

5. The system of claim 1 wherein said storing means includes means for storing encrypted signatures and discriminator data.

6. The system of claim 1 wherein said discriminator datum is the elapsed time spent by said user in registering said signature.

7. The system of claim 1 wherein said discriminator datum is the number of times said user has erased a signature before completing the signature's registration to the user's satisfaction.

8. The system of claim 1 wherein said discriminator datum is an indication of the size of said signature.

9. The system of claim 1 wherein said discriminator datum is a density ratio defined as a ratio of a predetermined number of discrete data points within a signature area to the number of discrete data points that are associated with a line or lines representing said signature.

10. The system of claim 1 wherein said means for registering said signature also includes means for registering the date and time of said signature's registration.

11. A method for verifying the identity of a person participating in course sessions on a computer-based training system comprising:
  (a) registering a machine-readable form a representation of a verified signature of an authorized person;
  (b) discerning at least one selected discriminator datum of said verified signature;
  (c) storing said representation of said verified signature and said selected discriminator datum of said verified signature;
  (d) requesting that a user of said training system register a session signature, said request occurring at a random time during said training session;
  (e) registering in machine readable form a representation of the session signature;
  (f) discerning said selected discriminator datum of said session signature;
  (g) storing said representation of said session signature and said selected discriminator datum of said session signature; and
  (h) comparing respective selected discriminator data of said verified signature and said session signature.

12. The method of claim 11 wherein said selected discriminator datum is the elapsed time for a signature to be registered.

13. The method of claim 11 wherein said selected discriminator datum is the number of times said user erases a sample signature before completing the registration thereof to said user's satisfaction.

14. The method of claim 11 wherein said selected discriminator datum is an indication of the size of said signature.

15. The method of claim 11 wherein said selected discriminator datum is a density ratio defined as a ratio of a predetermined number of discrete data points within a signature area to the number of discrete data points that are associated with a line or lines representing said signature.

16. The method of claim 11, including the additional steps of encrypting said representation of a registered signature and said selected discriminator datum before storing, and then decrypting said encrypted stored signature representation and selected discriminator datum before carrying out said comparing step.

17. The method of claim 11, including the additional step of flagging a session signature having a discriminator datum that is anomalous to the corresponding discriminator datum of said verified signature.

18. The method of claim 17, including the additional step of displaying representations of said verified signature and said flagged session signature for visual comparison.

19. A method for verifying signatures of students using a computer-based training system, comprising:
  (a) registering in machine-readable form a representation of a verified signature of the student;
  (b) discerning one or more selected discriminator data pertaining to said verified signature;
  (c) storing said verified signature and associated discriminator data;
  (d) executing a software program that provides a session of instruction to the student;
  (e) requesting that the student make a session signature, said request occurring at an interval during the session;
  (f) registering in machine-readable form a representation of said session signature;
  (g) discerning one or more discriminator data of said session signature;
  (h) storing said representation of said session signature and associated discriminator data; and
  (i) comparing respective selected discriminator data of said verified signature and said session signature so as to determine whether said verified signature and said session signature were made by the same person.

20. The method of claim 19 wherein said selected discriminator data includes the elapsed time for a signature to be registered.

21. The method of claim 19 wherein said discriminator data includes an indication of the size of said signature.

22. The method of claim 19 wherein said discriminator data includes a density ratio defined as a ratio of a predetermined number of discrete data points within a signature area to a number of discrete data points that are associated with a line or lines representing the signature.

23. The method of claim 22 wherein the discrete data points correspond to pixels on a visual display device.

24. The method of claim 22 wherein the discrete data points correspond to X-Y data points on a digitizing tablet.

25. The method of claim 19 further including the steps of encrypting said representation of a registered signature and associated discriminator data before the step of storing same and then decrypting said encrypted signature representation and associated discriminator data before carrying out said comparing step.

26. The method of claim 19 including the additional step of flagging a session signature having discriminator data that is anomalous to the corresponding discriminator data of said verified signature.

27. The method of claim 19 including the additional steps of displaying representations of said verified and session signatures on a visual display and further displaying a comparison of said discriminator data.

28. A computer based instruction system, comprising:
  (a) a computer;
  (b) a software program that operates on said computer and provides a course of instruction to a student;
  (c) signature input means for requesting a student signature, digitizing said signature and transmitting said signature to said computer;

(d) a data storage means;

(e) log means for logging from said computer into said storage means signatures that are input by said student; and (f) comparison means, including a display, for accessing two or more of said logged signatures and comparing their respective similarities and differences, whereby the attendance of the student during said instruction course may be verified.

29. The system of claim 28 further comprising encryption means for encrypting all signatures prior to logging said signatures into said log means.

30. The system of claim 29 further comprising a decryption means whereby the encrypted signatures are decrypted prior to comparison by said comparison means.

31. A method of comparing handwritten signatures, comprising the step of comparing the density ratios associated with a pair of respective signatures, said density ratio being defined as the ratio of a total number of data points within a predetermined area containing a signature to be compared to the number of data points associated with the line or lines that represent said signature.

* * * * *

UNITED STATES PATENT AND TRADEMARK OFFICE
CERTIFICATE OF CORRECTION

PATENT NO. : 5,199,068
DATED : March 30, 1993
INVENTOR(S) : Robert R. Cox

It is certified that error appears in the above-indentified patent and that said Letters Patent is hereby corrected as shown below:

Title page, item [57]:
Abstract, Line 7: delete "singature" insert --signature--

Column 4, Line 60: delete "form" insert --from--

Column 5, Line 15: delete "Apologizing" insert --Analogizing--

Signed and Sealed this

Twenty-second Day of February, 1994

Attest:

BRUCE LEHMAN

Attesting Officer    Commissioner of Patents and Trademarks